July 22, 1930.   H. SCHLAICH   1,771,193
TEMPERATURE RESPONSIVE ELEMENT
Filed Oct. 1, 1926
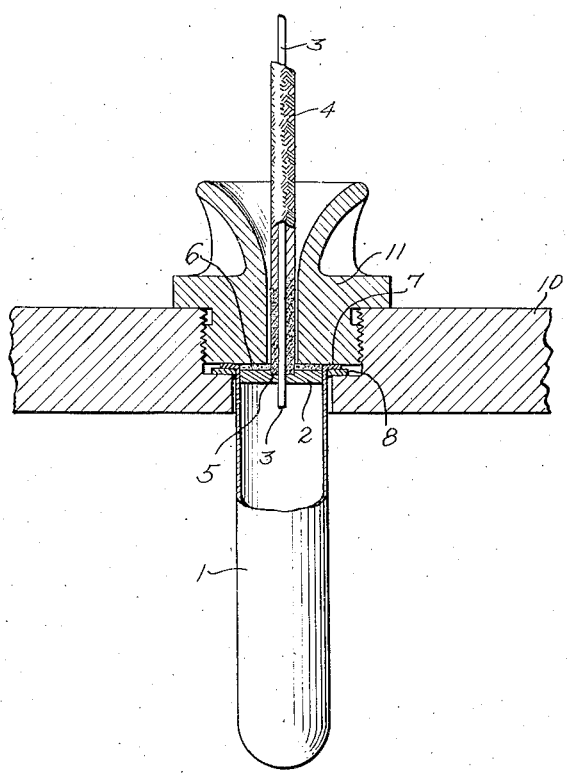
INVENTOR
HERMAN SCHLAICH
BY Moses & Nolte
ATTORNEY Patented July 22, 1930

1,771,193

UNITED STATES PATENT OFFICE

HERMAN SCHLAICH, OF LONG ISLAND CITY, NEW YORK

TEMPERATURE-RESPONSIVE ELEMENT

Application filed October 1, 1926. Serial No. 138,951.

This invention relates to temperature responsive elements used in heat actuated instruments of the distance type.

It is an object of the invention to reduce the cost of these elements by manufacturing them according to a more economical method than that heretofore followed.

It is a further object to improve the elements by reducing the material required in their manufacture to render them more compact and at the same time lower the cost of material.

It is a further object to effect the connection between the element and the armored capillary tubing in such manner that the tubing armor is reinforced and stiffened adjacent the element and thus rendered less susceptible to breakage or other damage. Other objects and advantages will hereinafter appear.

The drawing forming a part of this specification shows a temperature responsive element connected to the capillary tubing and mounted on a supporting member.

The temperature responsive element made in accordance with the present invention comprises a drawn shell 1 of ductile metal and a small, flat, metallic plug 2 driven into the upper end of the tube. The plug is driven in far enough to locate its outer face within the bounds of the shell. The plug 2 has a small opening through it through which a capillary tube 3 is inserted. The capillary tube is encased in a braided armor 4, the lower end of which is set into a countersink or recess 5 in the upper face of the plug 2. The plug 2 is sealed in the shell 1 by the application of hard solder, as silver solder 6 applied over the entire upper face of the plug. This solder is effective at one operation to seal the space between the plug and the shell 1, to seal the space between the plug and the capillary tube 3, and to anchor the lower end of the braided armor 4. Besides these functions the silver solder performs still another very important function. When in a fluid state the solder creeps up the armor braid 4 by capillary attraction, filling the interstices between the strands of the braid for a substantial distance, perhaps roughly a half inch. This renders the braid quite rigid adjacent the temperature responsive element so that jolting does not tend to bend it or to pull it loose.

The shell 1 has a flange 7 at its upper end, which, in the illustrative embodiment of the invention, is utilized for positioning and supporting the element. In associating the element with the body whose temperature is to be measured a gasket 8 is first placed on the shell 1 to rest against the lower face of the flange 7, and the element may then be inserted through an opening formed in a supporting wall 10 of the body or mechanism whose temperature is to be measured. A nut 11 is then screwed down into the wall 10 so that the flange 7 and the gasket 8 are clamped under pressure between the nut and the bottom of the recess in the wall 10.

By the described method of manufacture the making of the temperature responsive elements and the connecting of them to the capillary tubing is considerably simplified and cheapened. Where according to the prior method separate soldering operations had to be performed for securing a stem in the element shell and for sealing the capillary tubing in the stem, these operations are now combined into a single operation and such operation serves also to anchor and reinforce the braided armor.

The provision of clamping means for anchoring the lower end of the braided armor is obviated and the connection of the armor is more secure than that formerly effected by such clamping means.

The number of parts required is reduced and the size of the plug is very much less than that of the stem previously employed, so that the manufacture is cheapened by the saving of material, and the element with its associated parts forms a more compact unit than heretofore.

Variations may be resorted to within the scope of the invention and parts of the improvements may be used without others.

I claim:

1. In a temperature operated device, in combination, a shell, a plug lying completely in the mouth of the shell, a capillary tube inserted through the plug and solder covering the face of the plug and sealing the plug to the shell and to the capillary tube.

2. In a temperature operated device, in combination, a shell, a plug lying completely in the mouth of the shell, a capillary tube inserted through the plug, braided armor encasing the capillary tube and terminating adjacent the outer face of the plug, and solder covering the outer face of the plug for sealing the plug to the shell and to the capillary tube and for securing the plug to the braided armor.

3. In a temperature operated device, in combination, a shell, a plug lying completely in the mouth of the shell, a capillary tube inserted through the plug, braided armor encasing the capillary tube and terminating adjacent the outer face of the plug, and solder covering the outer face of the plug for sealing the plug to the shell and to the capillary tube and for securing the plug to the braided armor, the solder extending also along the braided armor for a substantial distance outward from the plug to stiffen and reinforce the capillary tube.

4. In a temperature operated device, in combination, a shell, a plug lying completely in the mouth of the shell, a capillary tube inserted through the plug, braided armor encasing the capillary tube and terminating adjacent the outer face of the plug, and hard solder connecting the braided armor to the plug and reinforcing and stiffening the braided armor for a substantial distance outward from the plug.

5. In a temperature operated device, in combination, a shell, a capillary tube, a plug adapted to fit in the mouth of the shell and having a passage therethrough in which the capillary tube is received, said plug having an outwardly facing surface extending from the periphery of the plug to the passage therethrough and being inserted in the shell far enough to locate said surface within the mouth of the shell, and solder covering said surface of the plug and sealing the plug to the shell and to the capillary tube.

In testimony whereof I have affixed my signature to this specification.

HERMAN SCHLAICH.